United States Patent [19]

Fujishita et al.

[11] Patent Number: 5,390,493

[45] Date of Patent: Feb. 21, 1995

[54] APPARATUS FOR CONTROLLING THE ELECTRIC HEATING OF CATALYST

[75] Inventors: Masakatsu Fujishita, Mito; Takeshi Atago, Katsuta; Keiichi Mashino, Katsuta; Suetaro Shibukawa, Katsuta; Shigeyuki Yoshihara, Katsuta, all of Japan

[73] Assignees: Hitachi, Ltd., Tokyo; Hitachi Automotive Engineering Co., Ltd., Katsuta, both of Japan

[21] Appl. No.: 10,620

[22] Filed: Jan. 28, 1993

[30] Foreign Application Priority Data

Jan. 30, 1992 [JP] Japan .................. 4-014719
Feb. 20, 1992 [JP] Japan .................. 4-033132

[51] Int. Cl.6 ............................... F01N 3/28
[52] U.S. Cl. ........................... 60/284; 60/300
[58] Field of Search ..................... 60/284, 300

[56] References Cited

U.S. PATENT DOCUMENTS

| 5,094,198 | 3/1992  | Trotta  | 123/179.21 |
| 5,163,290 | 11/1992 | Kinnear | 60/284 |
| 5,191,763 | 3/1993  | Yuuki   | 60/284 |
| 5,257,501 | 11/1993 | Wataya  | 60/284 |

FOREIGN PATENT DOCUMENTS

| 1308736    | 10/1962 | France  | 60/284 |
| 63-297759  | 5/1988  | Japan . |        |

Primary Examiner—Douglas Hart

[57] ABSTRACT

A catalyst heating control device for cleaning automotive engine exhaust gases, comprising a generator, at least one battery, a catalyst heating control apparatus, a battery charging device and an electronic fuel injector. Before starting the engine, the catalyst is preheated. At the start of the engine, the catalyst preheat control is curtailed according to the state of the batteries. The catalyst current control is performed by detecting the catalyst activation temperature. The catalyst is heated usually to about 350° C., at which point the current supply for heating is terminated.

20 Claims, 9 Drawing Sheets

FIG. 6

APPARATUS FOR CONTROLLING THE ELECTRIC HEATING OF CATALYST

BACKGROUND OF THE INVENTION

The present invention relates to a catalyst heating control apparatus suitable for cleaning exhaust gases from automotive engines.

In conventional heating control devices, as discussed in the SAX, Technical Paper, Series, 900503 (1990) page 61-70, the catalyst is formed on a resister type metallic carrier, which is heated by passing a current through it. Such catalyst heating control devices are designed to heat the catalyst to about 350° C. (the catalyst activation temperature) within 30 seconds by using a conventional 12-V power supply system. The control includes a catalyst heating current supply and a catalyst temperature sensor in order to heat the catalyst to a desired operation temperature. Such conventional catalyst control device can improve the exhaust gas quality at low temperatures.

The above-mentioned conventional art has no special power supply that supplies current to the catalyst. Neither is any provision made to curtail the flow of current to the catalyst during cranking of the engine by the starter motor when the engine is started. When the charging capacity of the battery drops due to use of the engine battery to heat the catalyst, it becomes difficult to start the engine. This is a significant problem because the power required to heat the catalyst is about 4.7 kW, which is a significant burden for the conventional power supply, and leads to possible discharges and degradation of the power unit.

Moreover, to minimize pollution of the atmosphere by exhaust gases, it is desirable to preheat the catalyst prior to the start of the engine so that the catalyst is at a temperature as close as possible to the catalyst activation temperature when the engine is started. Frequent heating of the catalyst, however, can result in degradation of the charging capability of the power supply, which in turn degrades the performance of the engine's starter motor, absent protective measures provided in the method and apparatus according to the invention.

SUMMARY OF THE INVENTION

The present invention is intended to solve the above problems. A first object of the invention, therefore, is to improve the reliability of engine starting by providing, in one embodiment of the invention, a power source for heating the catalyst which is separate from the engine starting supply.

A second object of the invention is to enhance the transmission efficiency of the power supply by providing a voltage for the separate power supply which is higher than that of the engine starting power supply. These measures will reduce the cost, size and weight of the power supply control apparatus.

Another object of the invention is to improve the cleaning of unburned gases emitted immediately after the start of the engine, by preheating the catalyst prior to the engine starting.

Another object of the invention is to set the target catalyst heating temperature to 350° C. which is close to the activation temperature of the catalyst, to eliminate unnecessary power consumption.

Still another object of the invention is to provide an efficient method of limiting the heating of the electrically heated catalyst to a relatively short period of time.

By controlling the temperature in this manner, it is possible to eliminate unnecessary power consumption.

A further object of the invention is to provide a power source which is independent of the engine and associated charging and control means, and to use an ac/dc converter and alternator as a charger for this power supply, thereby reducing the size of the equipment and saving the installation space on the vehicle.

Another object of the invention is to charge the power supply with the ac/dc converter only after the engine has been started so that the engine control power supply is not burdened.

Another object of the invention is to provide a charge control means for controlling the charging of the power supply with the ac/dc converter, which can eliminate unnecessary charging and prolong the life of the power supply.

Yet a further object of the invention is to place the electrically heated catalyst upstream of the conventional main catalyst in the exhaust gas flow, so that the catalyst can receive heat of the exhaust gas, reducing the power required to heat it.

A further object of the invention is to incorporate the current control means for the electrically heated catalyst into the engine control unit to reduce its size and the installation space on the vehicle.

Another object of the invention is to prevent a possible failure of the starter to operate caused by the starter drive power supply being heavily burdened, which could occur when a single power supply is used simultaneously to heat the electrically heated catalyst and to crank the engine during starting.

Another object is to provide a method of detecting the starting condition of the engine, i.e., to decide whether the engine is being cranked by checking the starter switch signal and the engine revolution speed.

These and other objects and advantages are achieved by a first embodiment of the electric catalyst control apparatus according to the invention, in which a separate power source is provided to heat the catalyst. This embodiment comprises: a catalyst heated by electric current; a temperature sensor to detect the temperature of the electrically heated catalyst; a control for current applied to the electrically heated catalyst; a power supply independent of the engine control power supply; and a charging means for power supply independent of the engine control power supply.

In a preferred embodiment of the invention, a single power source is used both to heat the electrically heated catalyst and to crank the engine. However, means are provided to curtail the flow of current to the catalyst during cranking of the engine, so as to prevent an unacceptable drain of current from the battery. In a further embodiment, means are provided for sensing the output voltage of the battery, and to permit heating of the catalyst during cranking only as long as the battery voltage remains above a predetermined threshold level.

In the electrically heated catalyst control apparatus according to the invention, the temperature sensor begins to monitor the temperature of the catalyst, and the control applies current to the catalyst to heat it, before the engine is started. Hence, it is possible to enhance the unburned gas cleaning efficiency immediately after engine is started, reducing the HC and CO emissions. By setting the voltage of the separate power supply that supplies current to the catalyst (according to the first embodiment mentioned above) higher than that of the engine starting power source, the current applied to the catalyst can be held small, affording a reduction in wiring, a smaller size of the control apparatus and an improved power transmission efficiency. In embodiments having a single power source, since the supply of current to the catalyst is curtailed when the starter is being driven, the starter drive power supply can be prevented from failing due to the electric load of the catalyst.

Other objects, advantages and novel features of the present invention will become apparent from the following detailed description of the invention when considered in conjunction with the accompanying drawings.

DETAILED DESCRIPTION OF THE DRAWINGS

Figure 1:
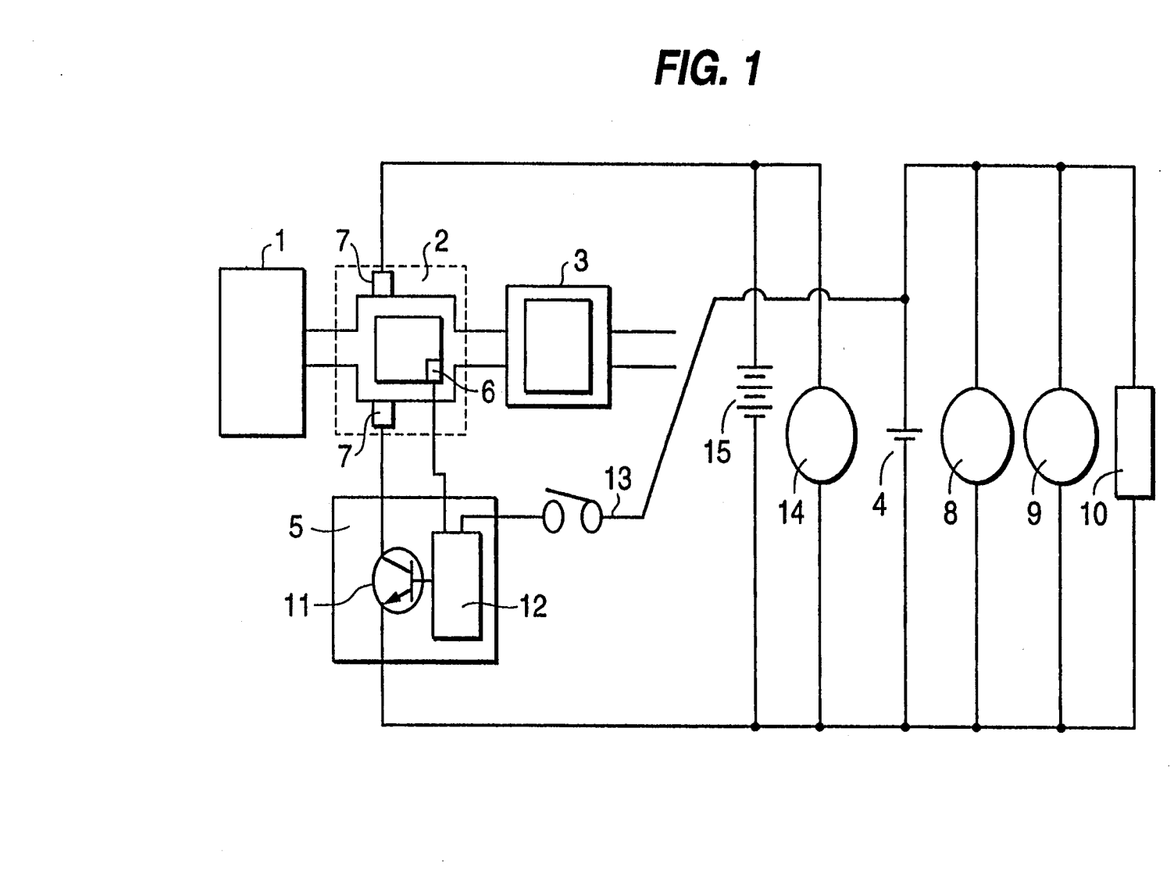
FIG. 1 is a schematic diagram which illustrates the operating principals a first embodiment of the catalyst control according to the invention, which has separate batteries for engine starting and EHC heating.

FIG. 1 is a conceptual block diagram which illustrates the operating principles of a first embodiment of the invention, in which a separate power supply is provided to heat the catalyst. The unburned gas exhausted from an internal combustion engine 1 passes through a precatalyst 2, and a main catalyst 3 (larger in capacity than the precatalyst 2), and is discharged into open air. The precatalyst 2, which is an electrically heated catalyst (EHC) described in the SAX Paper (900503), has a temperature sensor 6 to detect the temperature of the catalyst, and two terminals 7 to supply electric current. (This embodiment uses the EHC as the precatalyst. The invention can also be applied to cases where the precatalyst has a plurality of EHC's which are tributary to a single main catalyst, where both the precatalyst and the main catalyst employ EHCs.)

One of the two terminals 7 is connected with a battery 15 and the other with the collector of an n-p-n transistor 11 of the engine control unit (ECU) 5. The engine control unit consists of the transistor 11-which generates an EHC control signal to control the supply of current to the precatalyst 2-and a control circuit 12 that receives a signal from the temperature sensor 6. The control circuit 12 generates a duty drive signal to the base of the transistor 11. The emitter of the transistor 11 is connected to the minus terminals of the batteries 4, 15. The battery 4 is a conventional 12-V battery, connected to an alternator 8, a starter motor 9 and an electric load 10. An ignition switch 13 is connected between the control circuit 12 and the battery 4.

Figure 2:
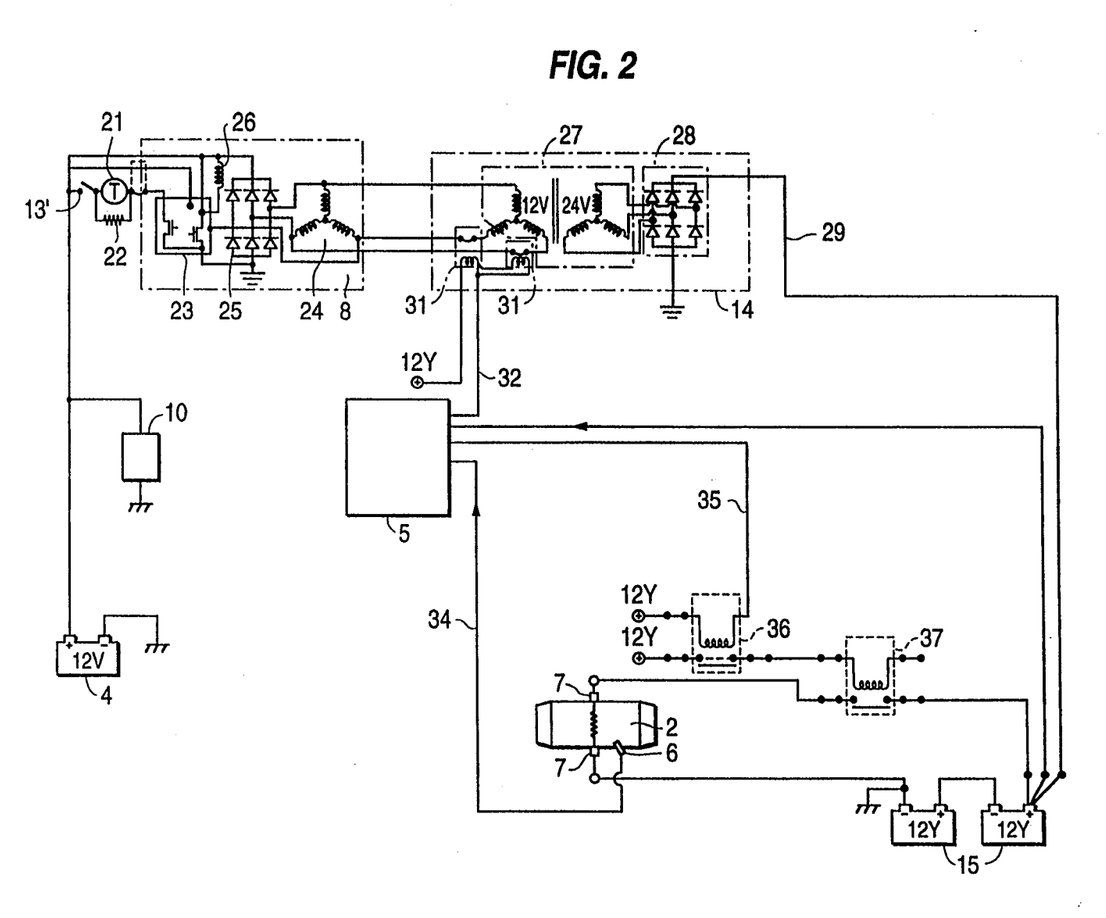
FIG. 2 is a schematic diagram which shows another embodiment of a battery charging circuit and the catalyst heating circuit according to the invention.

Preferably, the independent battery 15 has a voltage equal to or higher than that of the battery 4 (for example, 24 V), and has a dedicated charger 14. The charger may be an alternator separate from the engine control alternator or a combination of a three-phase transformer and an ac/dc convertor, as shown in FIG. 2. The battery 15 is separate from and independent of the battery 4, except at the ground line.

When the key switch 13 is turned on, a microprocessor contained in the engine control unit (ECU) 5 performs a feedback control by taking the preset catalyst temperature value (about 350° C.) as a demand value and the signal from the temperature sensor 6 as a feedback value. The control circuit 12 controls the duty cycle of the signal to the base of the transistor 11 so that the temperature of the precatalyst 12 closely approximates the preset value. When the temperature of the precatalyst 2 reaches 350° C., the transistor 11 is turned off to stop the current supply that is used to heat it.

The current that is supplied during the on cycle of the transistor 11 flows from the battery 15, through the precatalyst 2 and the transistor 11 to generate heat due to the electric resistance of the precatalyst. Therefore, when the engine is started by the battery 4 and the starter motor 9, after the catalyst is heated, the unburned gas cleaning efficiency of the catalyst is sufficiently high that noxious components contained in the unburned gas such as HC and CO are removed substantially. Furthermore, even after the independent battery 15 has been used for heating the precatalyst 2, and its charge is reduced accordingly, engine starting performance is not affected, because the battery 4 for driving the engine starter motor is independent of the catalyst heating battery 15.

FIG. 2 contains another embodiment of the invention, and shows the details of the battery charging circuit 14 and the catalyst heating circuit. The ignition switch 13' is connected in series with an ignition warning light 21 and a ballast resistor 22 connected in parallel therewith. The ignition warning light 21 is connected to an IC regulator 23 incorporated in the alternator 8, which has a Y-connection for the starter to produce a 3-phase ac output. The 3-phase ac output of the stator 24 is rectified normally to 12 V by a diode bridge 25 and then supplied to an electric load 10 and to the battery 4. An induction coil 26 is installed in a known manner as a built-in circuit between the plus terminal of the battery and the regulator 23.

According to the invention, the 3-phase ac output from the stator coil 24 is also fed to the charger 14, where it is stepped up from 12 V to 24 V by a 3-phase transformer 27 and sent to the rectifier 28. The 24-V battery 15, which consists of two serially connected 12-V batteries that supply electricity to the electrically heated catalyst (EHC) 2, is charged by the ac/dc converter 28.

The stator 24 and the 3-phase transformer 27 are interconnected through relays 31 which are controlled by the ECU 5 via line 32. The ECU 5 monitors the voltage of the 24-V battery 15 via line 33, and controls its charging by ON/OFF switching. ECU 5 also monitors the output of the temperature sensor 6 through line 34, and sends an EHC conduction control signal through line 35 to a sub relay 36, which selectively sends a switching signal to a main relay 37 that can handle large currents, and turns on or off the supply of current of about 250 A from the battery 15 to the EHC 2.

Figure 3:
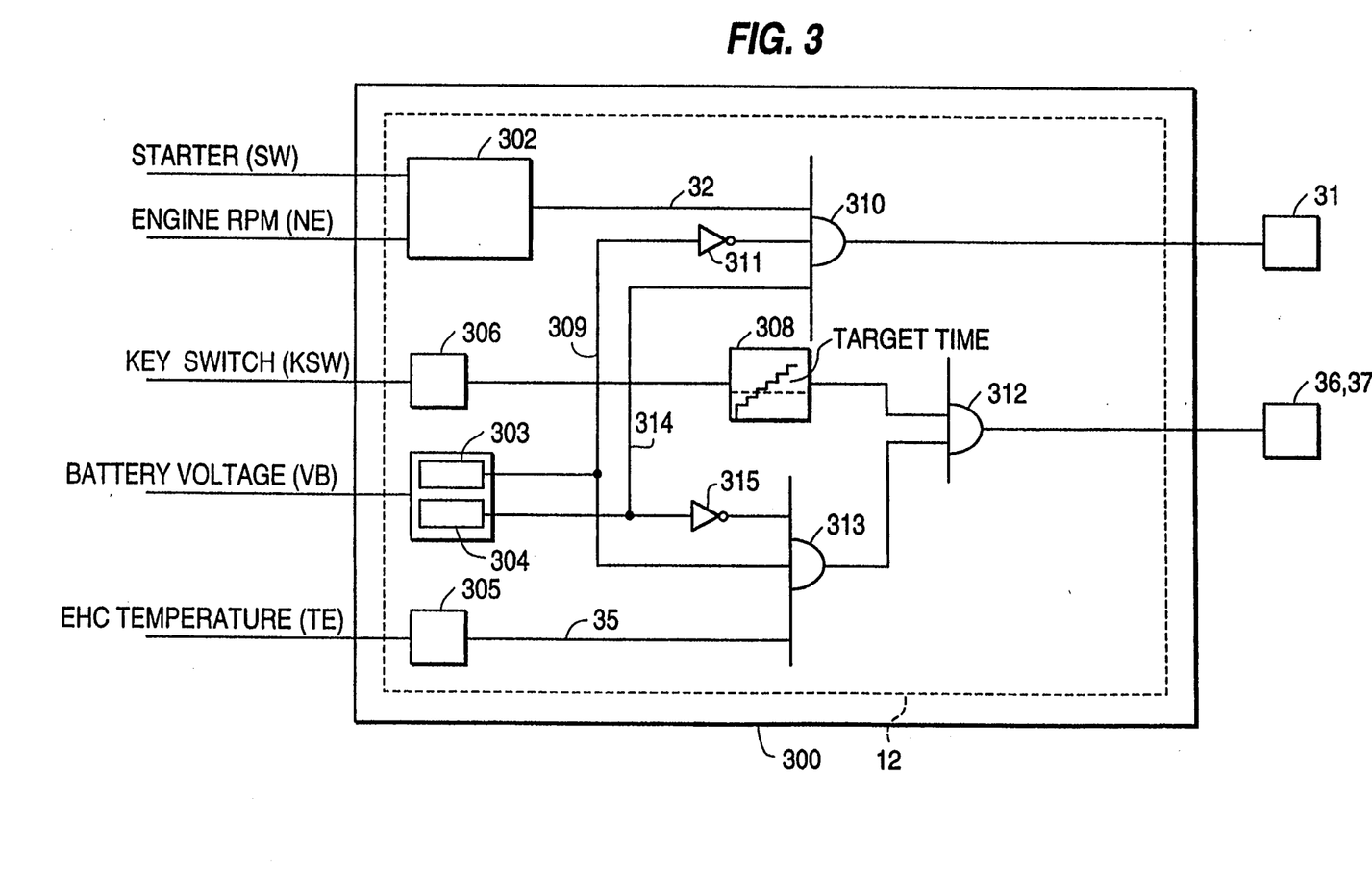
FIG. 3 is a logical schematic diagram showing the flow of the control signals according to the invention.

In FIG. 1, the control circuit 12 of EHC is incorporated in the engine control unit 5. It may, however, be independent of the engine control unit 5 and arranged inside the control circuit 300, as shown in FIG. 3. Control circuit 300 has an engine start completion decision unit 302, which determines whether the engine has started, based on an input signal Sw from the starter switch on the starter motor (not shown in FIG. 3) and a signal Ne from an engine revolution sensor (also not shown). Decision unit 302 outputs an ON signal to AND gate 310 via line 32 whenever the starter switch is in the off position (indicating that the starter motor is not operating) and the engine revolution speed has reached a predetermined threshold. AND gate 310 also receives input signals from battery charge voltage sensors 303 and 304, which monitor the state of charge of the battery 15. Sensor 303 detects when the battery voltage is greater than or equal to a first preset threshold level, and outputs a signal to line 309 which is inverted by inverter 311, while sensor 304 detects when the battery voltage is less than a second preset threshold level (which is lower than the first threshold level) and outputs a signal to line 314.

The temperature detected by the temperature sensor 6 is input to decision unit 305 which determines whether the EHC has reached the preset target value. When the temperature is lower than the preset target, the decision unit 305 outputs an ON signal to EHC control signal line 35, which is in turn connected to one input of AND gate 313. AND gate 313 also receives the outputs from sensors 303 and 304 via lines 309 and 314 (the output from sensor 304 being inverted by inverter 315), and sends an ON signal to AND gate 312 when ON signals are present at all three of its inputs. Furthermore, an output from the key switch power-on decision means 306 is supplied to the preheat decision means 308, an output from which is supplied to the AND gate 312, which activates the EHC current control relays 36, 37. Thereafter, the pre-heat decision means 308 also measures the time period during which the relays 36, 37 remain activated and turns them off (by means of AND gate 312) after a predetermined time (for example, 30 seconds) has elapsed, thereby preventing overheating of the catalyst and a wasteful unnecessary drain of battery charge in the event for example, of a fault in the EHC temperature sensor.

The ignition switch 13 is of a common type and has at least three positions-a power off position where the battery 4 is disconnected from all electric loads, a power on position (i.e., the key switch is on and the engine is running), and a start position where the induction coil 26 is energized to drive the starter motor 9 and start the engine.

After the ignition switch is turned off (thus stopping the engine), and then set to the ON position, decision unit 306 sends an ON decision signal to preheat decision unit 308, which outputs an ON signal to AND gate 312 for a predetermined period of time (for example, 30 seconds). When an ON signal is also received from AND gate 313, the AND gate 312 sends an ON signal to relays 36, 37 and enables preheating of the EHC.

When the decision unit 302 determines that engine starting is completed and the sensor 303 determines that the charge voltage of the battery 15 is equal to or higher than the first preset target value, the sensor 303 (via inverter 311 and AND gate 310) turns off the ac/dc converter control relay 31 to cut the charging line for the battery 15. The sensor 303 also turns on relays 36, 37 to supply power from the battery 15 to the EHC 2. If the voltage of the battery 15 is lower than the second preset target value and the engine is found to have already started, the sensor 304 turns ON the ac/dc converter control relay 31 to charge the battery 15 via the ac/dc converter 28 through line 29. At the same time, the sensor 304 (via inverter 315) also turns off the relays 36, 37, in order to stop EHC heating. By utilizing the outputs of sensors 303, 304 in this manner, it is possible to save power by not activating the ac/dc converter 28 when the battery is fully charged. On the other hand, when the battery voltage is very low, the supply of electricity to the precatalyst 2 is stopped.

Since it is desired to preheat the precatalyst 2 before the engine is started, when the ignition switch is set to the power on position, the decision unit 306 outputs an ON signal to preheat decision unit 308, which outputs an ON signal to AND gate 312 for a predetermined period of time. Dependent on the outputs from the sensors 303, 304 and 305 and decision unit 308, the AND gate 312 enables EHC current control relays 36, 37 in the same manner as described above. The control time for preheating can be changed or set to a desired value by timer 308 according to the capacity of the electrically heated catalyst, the power required to heat it and the capacity of the power supply.

Figure 4:
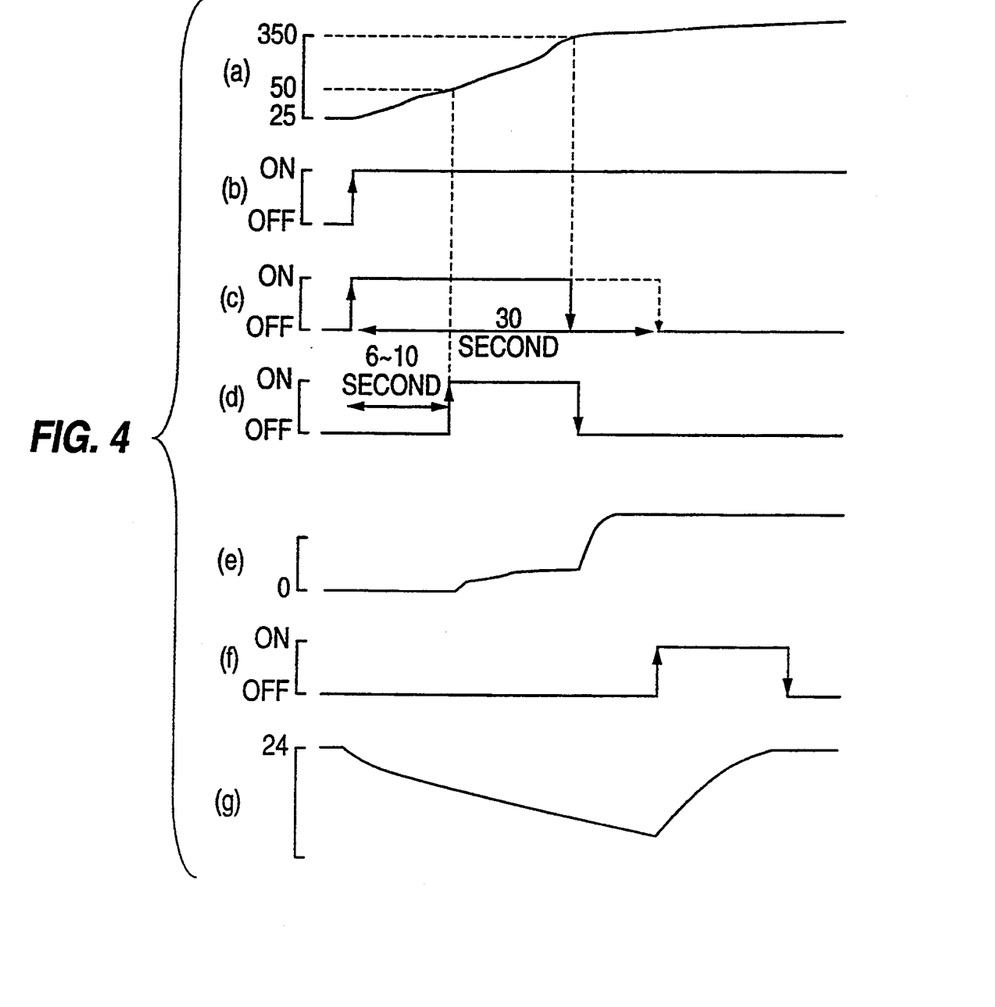
FIG. 4 show the operation timing of the control apparatus of the embodiments of the invention according to FIGS. 1 and 2.

Next, the control timing of the invention will be described by referring to FIGS. 4 (*a*) to 4(*g*). The temperature of EHC 2 when the engine is not being operated is usually the ambient air temperature (for example 25° C.), and the optimum operation of the EHC is at about 350° C. as shown in FIG. 4 (*a*). When, as shown in FIG. 4 (*b*), the ignition switch 13 is placed in the first position, (i.e., the power on position-key switch ON) and the engine is at rest (FIG. 4(*e*)), the decision unit 308 sends an ON signal to AND gate 312, which sends out an EHC control signal that activates relays 36, 37 as shown in FIG. 4 (*c*). The operation steps described below may be skipped, if so desired, by ignoring the decision on the voltage of the battery 15 made by the sensors 303, 304.

As soon as the EHC control signal is turned on, the battery 15 supplies power to the precatalyst 2 to heat it (FIG. 4 (*c*)). When the temperature of the precatalyst 2 reaches about 50° C. (in about 6-10 seconds), the ignition switch 13 is allowed to issue a drive signal to the starter motor 9 (as shown in FIG. 4 (*d*)). As the starter motor 9 rotates, the engine starts to-rotate (FIG. 4 (*e*), causing the alternator 8 to rotate with gradually increasing speed. Then, when engine starting is completed (the engine speed detected by the revolution sensor reaches a preset value), and the starter motor is turned off as indicated at 4 (*d*), the ac/dc converter control signal fed from the decision unit 302 through the line 32, is turned ON, and operation of the relay 31 (FIG. 4 (*f*)) is controlled according to the output signals from the sensors 303, 304. If the Voltage of the battery 15 is low (below the preset target value), the relay 31 is turned on (FIG. 4 (*f*)), so that the charger 14 consisting of the 3-phase transformer 27 and the ac/dc converter 28 charges the 24-V battery 15 through the line 29 (FIG. 4 (*g*)).

Although the charger 14 together with the ac/dc converter 28 is shown as a 3-phase transformer 27, it may be replaced by a known separate alternator or a twin-rotor twin-stator alternator with a second output.

FIG. 5 (*a*) is a partial block diagram showing an embodiment of the invention which has a single power supply system. The configuration and operation of this embodiment are similar to that of FIG. 1, except that the separate battery 15 and the separate charger 14 have been omitted, and the terminal 7 of the EHC which is connected to battery 15 in FIG. 1 is instead connected to the battery 4. The control circuit 12 incorporates a function to decide whether or not the engine is cranking, as explained in connection with FIG. 5 (b), below. When the engine is cranking, the control circuit 12 curtails the supply of electricity to the EHC. Whether the engine is cranking or not is determined by checking the starter signal and engine revolution speed.

FIG. 5 (b) shows the operation of the control circuit 12 in FIG. 5 (a). As noted previously, a system with only one power supply has a problem when the engine is cranking. That is, when the starter driving electric load and the catalyst heating electric load are simultaneously applied to the power supply, the power supply voltage may drop making it difficult to start the engine. On the other hand, however, if sufficient battery power is available to sustain both operations, it is desirable to continue EHC preheating during cranking in order to bring the catalyst as close as possible to its operating temperature before the engine is started. For this purpose, the control circuit 12 has a function to check if the engine is cranking or the engine starting is completed. When the engine is cranking, the control circuit 12 stops the supply of electricity to the electrically heated catalyst, unless the voltage VB of battery 4 at that time is sufficiently high to permit it to sustain both engine cranking and EHC heating without degrading the startability of the engine. Whether the engine is cranking or not is determined by using the starter signal and engine revolution signal.

FIG. 5 (b) may best be understood by reference to four operational modes. In the first mode, if the EHC temperature is below target (501), the engine is in a stopped condition (502) (based on inputs from the starter switch (517) and an engine speed sensor (518) in a manner analogous to that described with reference to FIG. 3), and the ignition switch is in the on position (503), then an EHC preheat permit signal is issued by AND gate (505). If at the same time, the battery voltage VB is greater than or equal to a preset target (506), an EHC current ON signal is issued (507) by AND gate (508) via OR gate (509), and the EHC control relay is turned on (510), heating EHC (511).

Figure 5A:
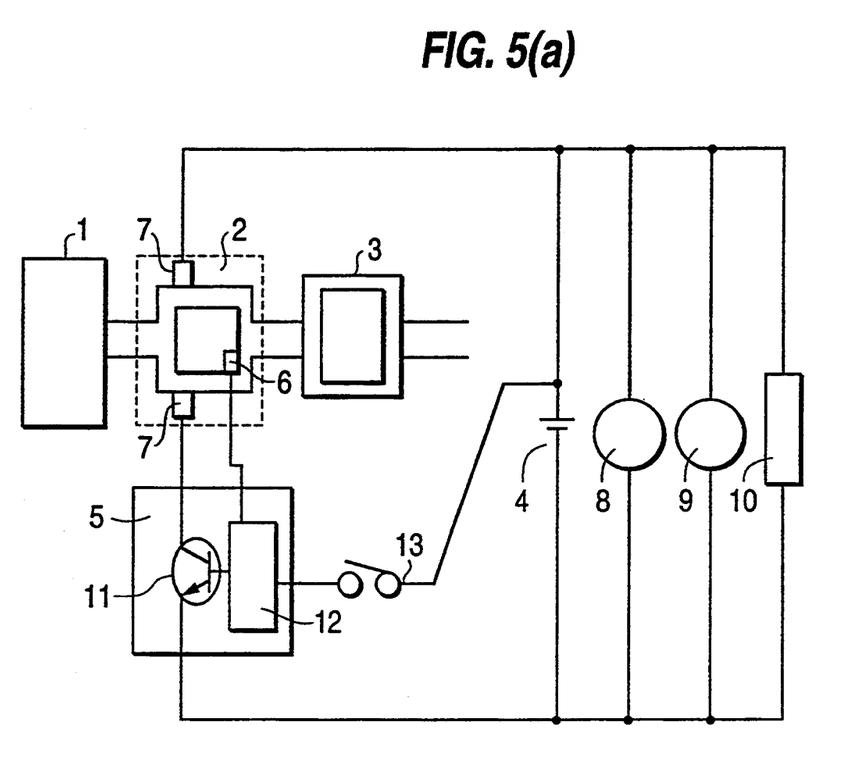
FIGS. 5(a) to 5(d) are conceptual block diagrams showing the operating principles of embodiments of the invention having a single power supply for the engine and EHC heating.
Figure 5B:
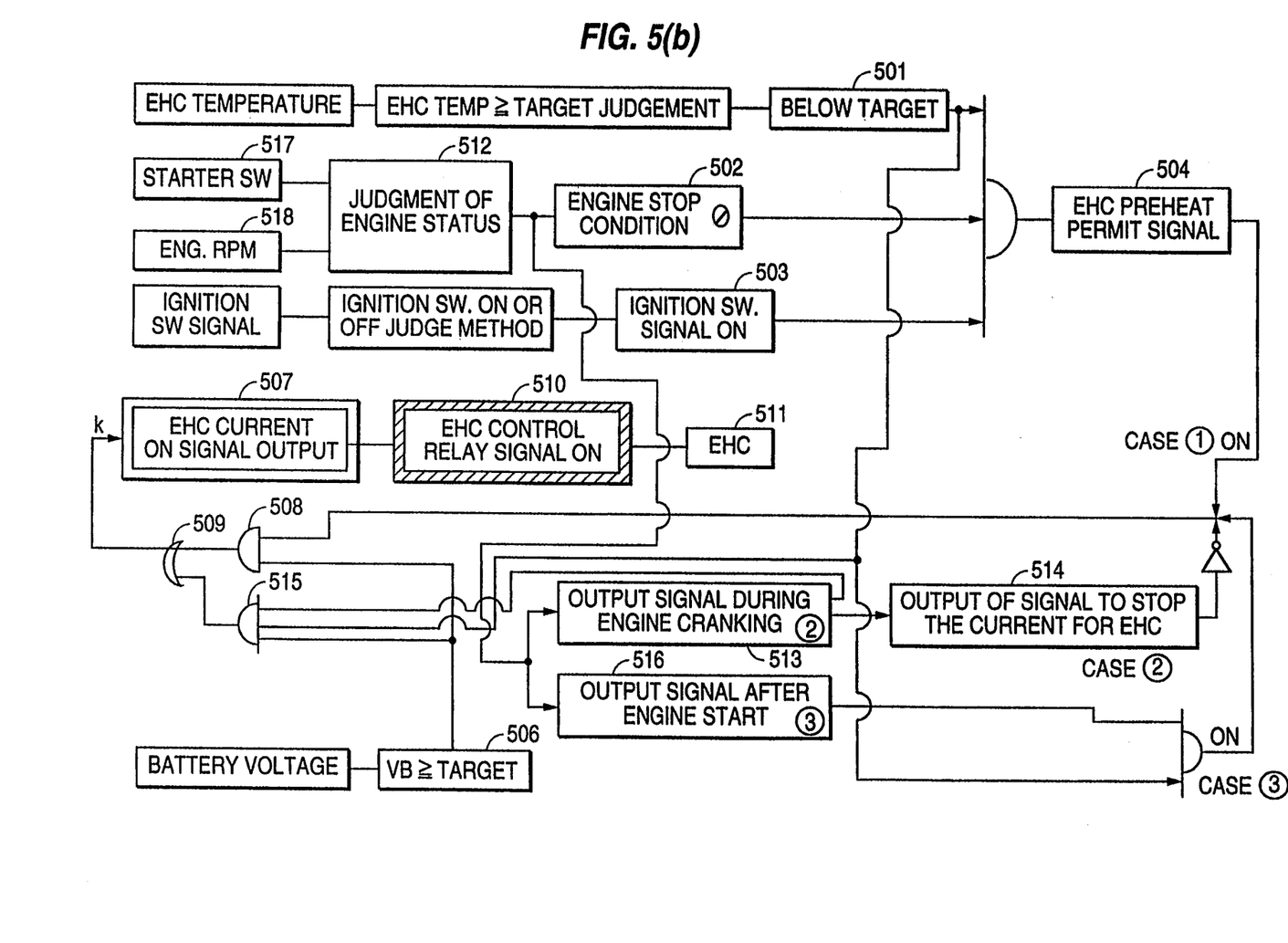
Figure 5C:
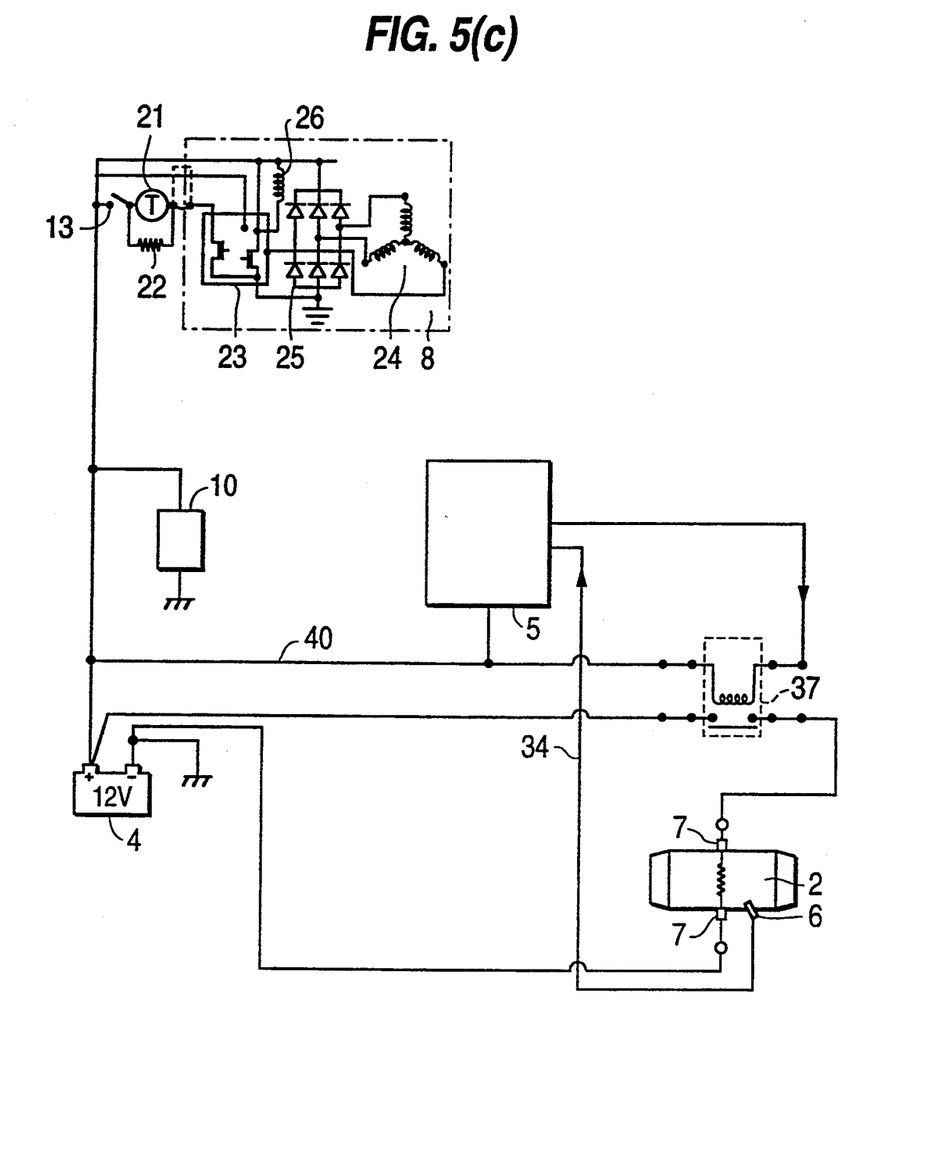

In the second operational mode, when the output signal from the judgment of engine status block 512 indicates that the engine is cranking (513), an output signal is generated at block 514 to inhibit the EHC preheat permit signal (504).

However, in the third mode, even when the engine is cranking (513), if the EHC temperature remains below target (501), and the battery voltage VB exceeds a preset target (506), then AND gate (515) is enabled, and outputs an EHC current on signal, via or gate (509), thus permitting heating of the EHC (510) during cranking.

Finally, in the fourth mode, after the output from the judgment of engine status block 512 indicates that the engine has started (516), if the EHC temperature remains below target (501), the AND gate (508) is again enabled and outputs a signal via OR gate (409) to resume heating of the EHC (that is, assuming that heating was disabled during cranking as noted above).

FIG. 5 (c) shows another embodiment of a one battery system according to the invention, which corresponds in structure and operation to that of FIG. 2, except that the second battery, the charger therefore and the subrelay 36 have been omitted; the relay 37 is connected directly to the battery 4, and drives the starter motor. The voltage of the battery 4 is monitored by the ECU 5 through the line 40, while the output of the temperature sensor 6 is also monitored by ECU 5 through the line 34. An EHC power supply control signal is transmitted to the relay 37, which can handle large currents, and turns on or off the supply of current of about 250 A from the battery 4 to the EHC 2.

In FIG. 5 (a), the control circuit 12 of the EHC is incorporated in the engine control unit 5. But, it may be independent of the engine control unit 5 and arranged inside the control circuit 300, as shown in FIG. 5 (d). The EHC control circuit 12 in FIG. 5 (d) has an engine start completion decision means 519 through which it receives an input signal from the starter motor (not shown) and an engine revolution signal (Ne). The unit 520 checks whether the charge voltage of the battery 4 is lower than a first predetermined voltage, and the unit 521 checks whether the charge voltage of the battery 4 is equal to or higher than a second predetermined voltage.

Figure 5D:
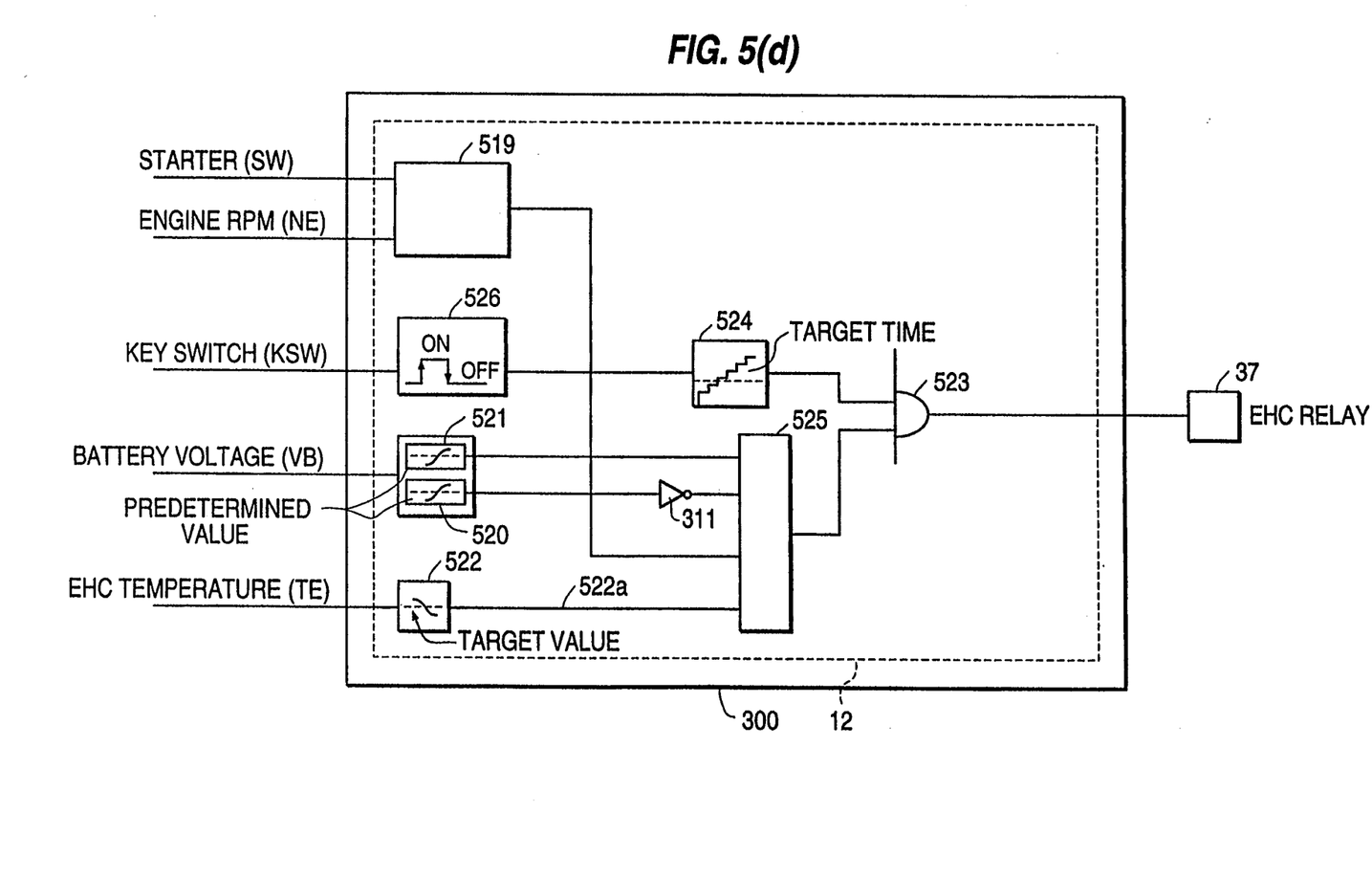

The temperature detected by the temperature sensor 6 is input to an idling completion temperature decision unit 522. When the temperature is lower than a predetermined target value, an ON signal is input into the AND gate 523 through line 522a and the EHC relay drive decision unit 525, depending on output of start completion decision means 519 and the battery charge voltage checking units 520, 521. Furthermore, an output from the key switch power-on decision unit 526 is also supplied to the preheat decision unit 524, an output from which is supplied to the AND gate 523, which controls the activation of the EHC current control relay 37. The preheat decision means 524 measures the time period during which the relay 37 remains activated and turns it off (by means of AND gate 523) after a predetermined time (for example, 30 seconds) has elapsed, thereby preventing overheating of the catalyst and unnecessary drain of the battery charge, in the event, for example, of a fault in the EHC temperature sensor. The decision unit 525 sends an output signal, even in engine cranking period, if the EHC temperature is lower than a predetermined value and the battery voltage is higher than a predetermined value.

When the engine start completion decision unit 519 determines that engine starting is completed and the battery charge voltage checking unit 521 determines that the charge voltage of the battery 4 is equal to or higher than a first predetermined value, the unit 521 sends an EHC control signal to the EHC current control relay 37 via decision unit 525 and AND gate 523, to supply power from the battery 4 to the EHC 2. If the voltage of the battery 4 is lower than a second predetermined value and the engine is found to have already started, the means 521 turns off the relay 37 in order to stop the EHC heating.

Since it is preferable that the precatalyst 2 be preheated before the engine is started, when the ignition switch is set at the power on position, an ON signal is input to preheat decision unit 524, which outputs an ON signal to AND gate 523, and the decision unit 525 issues an ON signal to the EHC current control relay 37 according to the results of decisions made by the means 520, 521 and 522.

Figure 6:
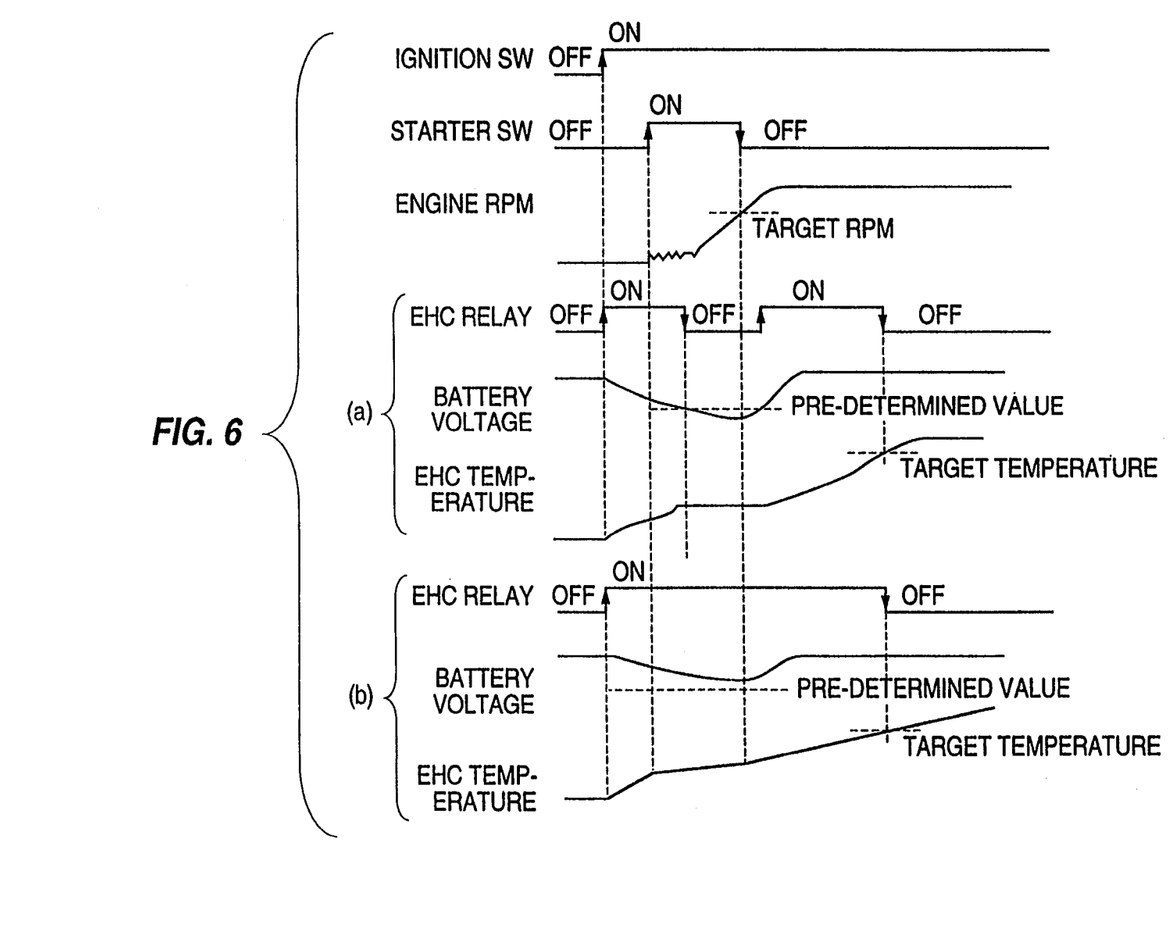
FIG. 6 is an operation timing diagram of the control apparatus in the embodiment of the invention illustrated in FIG. 5.

FIG. 6 is a timing chart which illustrates the operation of a one battery embodiment of the invention that operates upon the principles embodied in FIGS. 5 (a) and 5 (c). The first three lines of FIG. 6 show that the starter switch is turned on (initiating engine cranking) after a brief delay of several seconds following movement of the ignition switch to the on position. The third line of FIG. 6 shows that for a period after the starter switch is turned on, the engine rotates at the same speed as the starter motor, and thereafter increases as the engine commences to operate, until it reaches an idling speed.

The sets of graphs designated (a) and (b) illustrate the operation of the EHC relay in two cases. In both cases (a) and (b), EHC heating is enabled as soon as the ignition switch is turned on, the battery voltage begins to decrease accordingly as shown, and the EHC temperature starts to increase. In case (a), the battery voltage falls below a predetermined threshold value, at which point the EHC relay is turned off and the EHC temperature stabilizes. However, when the starter switch is turned off, the battery voltage increases, and when it crosses a predetermined threshold value, the EHC relay is once again activated and the EHC temperature starts to increase until it reaches a target value, the EHC relay is turned off, and the EHC temperature then stabilizes once more.

In case (b), the operation is similar except that the charge on the battery is sufficiently strong that the battery voltage never falls below the preset threshold value. Hence, the EHC relay remains activated during cranking and the EHC temperature rises constantly (albeit at a reduced rate during cranking due to the current drain of the starter motor) until the present target temperature is reached and the EHC is turned off.

According to this invention, when the charge capacity of the catalyst heating battery falls as a result of heating the catalyst (catalyst heating requires about 4.7 kW of power), the problem that the engine control battery 4 becomes too low in voltage to start the engine can be avoided. Further, since the catalyst is heated before starting the engine to enhance the unburned gas cleaning efficiency, it is possible to drastically reduce the HC and CO emissions contained in the unburned gas immediately after the engine is started. Moreover, since the power supply is kept high in voltage to reduce the current consumption, the components can be made small, reducing the overall weight of the apparatus and increasing the power transmission efficiency. This in turn results in a reduction in cost, size and weight of the control equipment. Where a single power supply is employed, the current supply to the electrically heated catalyst is curtailed when the engine is cranking if the battery voltage falls below a preset level. This prevents the electric load on the power supply from increasing, thus ensuring a reliable engine starting.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. Method of controlling a flow of electric current to a heater for an electrically heated catalyst in a pollution control apparatus for an internal combustion engine having an ignition switch, a power supply and a starter motor, said method comprising the steps of:

causing a heating current to flow to said heater when said ignition switch is placed into an ON position and temperature of said catalyst is below a predetermined threshold value;

sensing when said starter motor commences starting of said engine;

curtailing the flow of heating current to said heater during starting of said engine;

sensing completion of starting of said engine; and resuming the flow of heating current to said heater upon said completion of starting of said engine.

2. Method according to claim 1 further comprising the step of sensing an output voltage of said battery, wherein said curtailing of the flow of heating current to said heater in said curtailing step is performed only when said output voltage falls below a predetermined threshold value.

3. Method according to claim 1, wherein the flow of heating current to said heater in said resuming step is limited to a time period of fixed duration.

4. Method according to claim 2, wherein the flow of heating current to said heater in said resuming step is limited to a time period of fixed duration.

5. Method according to claim 1, wherein said step of sensing when said starter motor commences starting of said engine is performed by sensing at least one: of a starter signal indicative of a position of a starter switch of said starter motor, and engine revolution speed signal.

6. Method according to claim 2, wherein said step of sensing when said starter motor commences starting of said engine is performed by sensing at least one: of a starter signal indicative of a position of a starter switch of said starter motor, and engine revolution speed signal.

7. Method according to claim 3, wherein said step of sensing when said starter motor commences starting of said engine is performed by sensing at least one: of a starter signal indicative of a position of a starter switch of said starter motor, and engine revolution speed signal.

8. Method according to claim 1, wherein said step of sensing completion of starting of said engine comprises the steps of:

sensing a position of a starter switch of said starter motor;

sensing revolution speed of said engine; and generating a signal indicative of completion of starting of said engine when said switch of said starter motor is in an off position and said revolution speed exceeds a predetermined threshold value.

9. Method according to claim 2, wherein said step of sensing completion of starting of said engine comprises the steps of:

sensing a position of a starter switch of said starter motor;

sensing revolution speed of said engine; and generating a signal indicative of completion of starting of said engine when said switch of said starter motor is in an off position and said revolution speed exceeds a predetermined threshold value.

10. Method according to claim 5, wherein said step of sensing completion of starting of said engine comprises the steps of:

sensing a position of a starter switch of said starter motor;

sensing revolution speed of said engine; and generating a signal indicative of completion of starting of said engine when said switch of said starter motor is in an off position and said revolution speed exceeds a predetermined threshold value.

11. Method of controlling a flow of electric current to a heater for an electrically heated catalyst in a pollution control apparatus for an internal combustion engine having an ignition switch, a power supply and a starter motor, said method comprising the steps of:

sensing a position of said ignition switch;
causing a heating current to begin to flow to said heater when said ignition switch is moved from an OFF position to an ON position;
sensing a temperature of said catalyst;,
sensing an output voltage of said power source;
sensing when said starter motor commences starting of said engine;
upon said starter motor's commencing starting of said engine, curtailing the flow of said heating current unless said temperature of said catalyst remains below a predetermined threshold value and said output voltage of said power source remains above a predetermined threshold value;
sensing completion of starting of said engine; and
resuming the flow of heating current upon completion of said starting.

12. Method according to claim 11 comprising the further step of:

stopping the flow of heating current to said catalyst heater upon the expiration of a fixed time period following said resuming of the flow of heating current.

13. Apparatus for controlling a flow of electric current to an electrically heated catalyst in a pollution control apparatus for an internal combustion engine having a starter motor, said apparatus comprising:

a temperature sensor to detect a temperature of the electrically heated catalyst;
an electric power supply coupled to provide a flow of heating current to said electrically heated catalyst;
a sensor to measure an output voltage of said electric power supply;
means for controlling said flow of heating current so that the temperature of the electrically heated catalyst rises to and is maintained at a level which is substantially equal to a predetermined value; and means for curtailing said flow of heating current when said engine is being cranked by said starter motor during starting of said engine.

14. Apparatus according to claim 13, wherein said means for curtailing permits heating current to continue to flow during said cranking so long as the temperature of the catalyst remains below a predetermined threshold value and the output voltage of said power supply remains above a predetermined threshold level.

15. Apparatus according to claim 13, further comprising:

means for measuring the period of time during which said heating current is flowing to said electrically heated catalyst and for stopping the flow of heating current upon the expiration of a predetermined period of time.

16. Apparatus according to claim 15, wherein said means for measuring and for stopping is a preheat decision unit which activates the flow of heating current upon receipt of an ON signal from a logic circuit, measures the elapsed time following such activation and causes said flow of heating current to stop after a predetermined time period has elapsed.

17. Apparatus according to claim 16, wherein said predetermined time period falls within a range of from 6 to seconds to 10 seconds.

18. Apparatus according to claim 13 further comprising:

means for sensing when said starter motor is cranking said engine; and means for sensing when said starting of said engine has been completed.

19. Apparatus according to claim 18, wherein said means for sensing cranking of said engine comprises at least one of: a sensor for detecting a position of a starter switch of said starter motor, and a sensor for measuring a revolution speed of said engine.

20. Apparatus according to claim 18, wherein said means for sensing when said starting of said engine has been completed comprises:

a sensor to detect a position of a starter switch of said starter motor;
a sensor to measure revolution speed of said engine; and
means for generating a signal indicative of completion of said starting of said engine when said starter switch is in an off position and said engine revolution speed exceeds a predetermined threshold value.

* * * * *